United States Patent
Clayton et al.

(10) Patent No.: US 6,574,610 B1
(45) Date of Patent: Jun. 3, 2003

(54) TRUSTED ELEMENTS WITHIN A DISTRIBUTED BANDWIDTH SYSTEM

(75) Inventors: Michele Catherine Ann Mazza Clayton, Scottsdale, AZ (US); Elaine Harriett Alexander, Palatine, IL (US); John Francis Tunny, Mesa, AZ (US); Michael Keith Stinson, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/420,127

(22) Filed: Oct. 19, 1999

(51) Int. Cl.[7] .............................................. G06F 17/60
(52) U.S. Cl. ......................... 705/51; 705/412; 705/418
(58) Field of Search ........................... 705/1, 412, 418, 705/51

(56) References Cited

U.S. PATENT DOCUMENTS

| | | | |
|---|---|---|---|
| 5,577,100 A | * 11/1996 | McGegor et al. | 455/406 |
| 5,625,669 A | * 4/1997 | McGregor et al. | 455/418 |
| 5,828,737 A | * 10/1998 | Sawyer | 370/546 |
| 6,199,054 B1 | * 3/2001 | Khan et al. | 705/400 |

FOREIGN PATENT DOCUMENTS

| EP | 0 647 055 A1 | * 9/1994 | H04M/15/28 |
|---|---|---|---|
| GB | WO 99/65183 A2 | * 12/1999 | H04L/12/00 |

OTHER PUBLICATIONS

Aponet, Inc. "Aponet Establishes Traffic Policy Management for Intranet/Internet Bandwidth Usage". PR Newswire Aug. 14, 1997.*

Neon Software. "Neon Software: Neon Software Announces Cyberguage for Windows 95/98/NT". Business Wire. Jan. 1, 1999. Business Editors and High–Tech Writers.*

* cited by examiner

*Primary Examiner*—Hyung-Sub Sough
*Assistant Examiner*—James A. Reagan
(74) *Attorney, Agent, or Firm*—James E. Klekotka; Frank J. Bogacz

(57) ABSTRACT

A distributed bandwidth metering system (200) uses trusted elements throughout the system to collect and process usage data. The trusted elements in the distributed bandwidth metering system include subscriber units (210), at least one network controller (230), and at least one billing center (250). When subscriber unit (210) requests and obtains bandwidth from the system, subscriber unit (210) monitors its own usage and sends usage data to a network controller (230) in a predetermined manner. Network controller (230) assembles the data for a particular session and sends the data to a billing center. The billing center generates the billing and invoicing data using the session data.

16 Claims, 4 Drawing Sheets

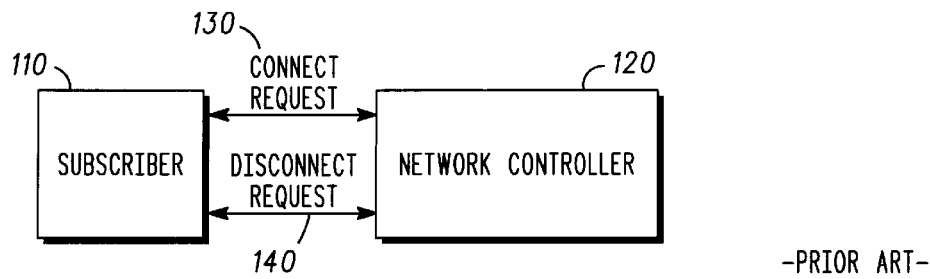
*FIG. 1* —PRIOR ART—
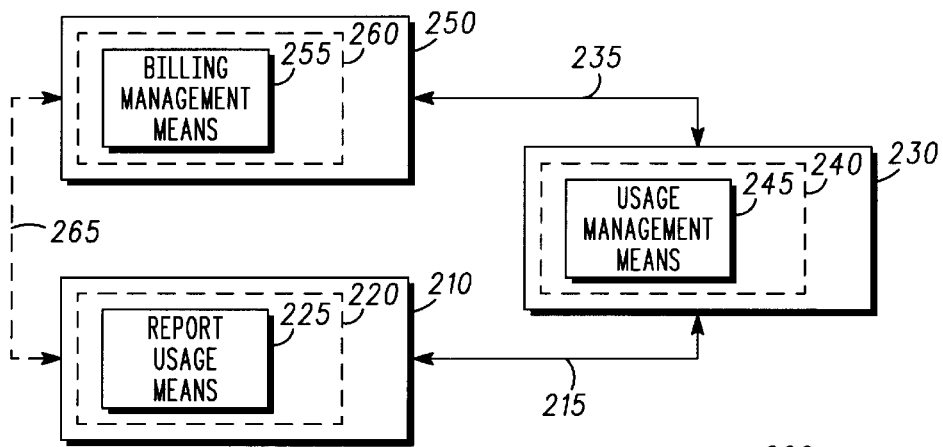
*FIG. 2*
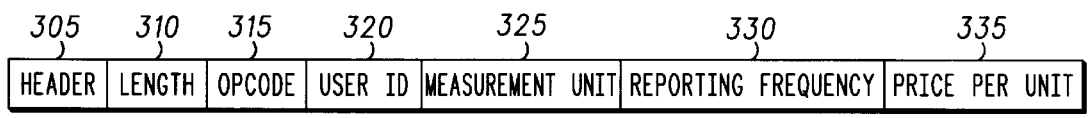
*FIG. 3*
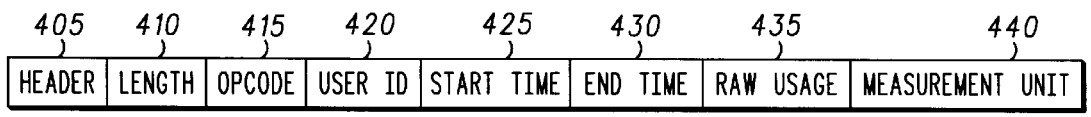
*FIG. 4*

| 505 | 510 | 515 | 520 | 525 | 530 | 535 | 540 | 545 | 550 |
|---|---|---|---|---|---|---|---|---|---|
| HEADER | LENGTH | OPCODE | CONTROLLER ID | ORIGINATOR ID | TERMINATOR ID | MEASUREMENT UNIT | SESSION START TIME | SESSION END TIME | TOTAL USAGE |

| 605 | 610 | 615 | 620 | 625 | 630 | 635 | 640 | 645 | 650 | 655 |
|---|---|---|---|---|---|---|---|---|---|---|
| HEADER | LENGTH | OPCODE | CONTROLLER ID | ORIGINATOR ID | TERMINATOR ID | ORIGINATOR MEASUREMENT UNIT | TERMINATOR MEASUREMENT UNIT | ORIGINATOR TOTAL USAGE | TERMINATOR TOTAL USAGE | TOTAL BILLED AMOUNT |

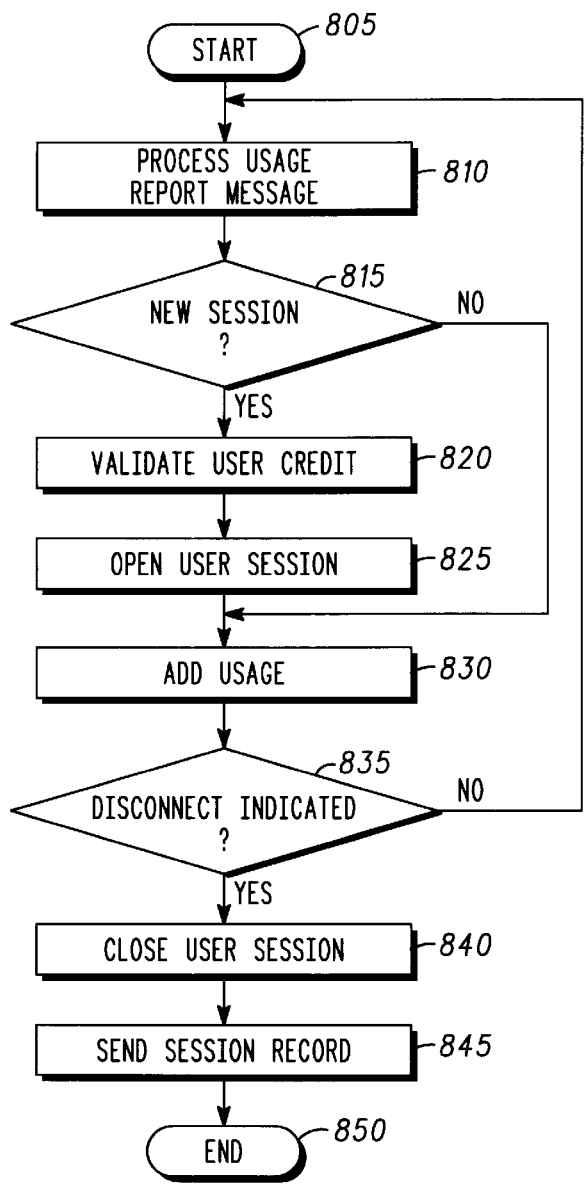
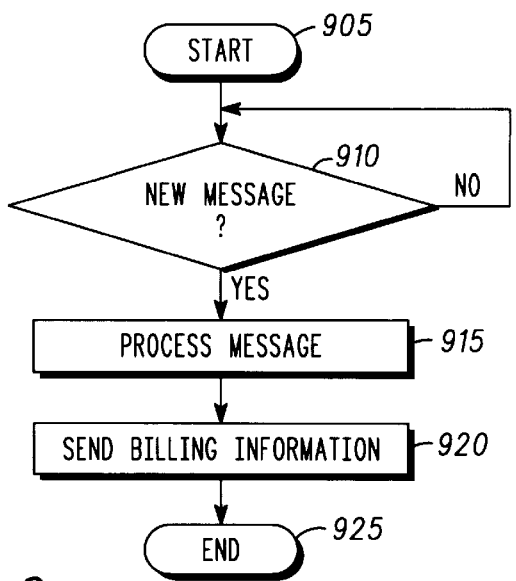
FIG. 8
FIG. 9

TRUSTED ELEMENTS WITHIN A DISTRIBUTED BANDWIDTH SYSTEM

FIELD OF THE INVENTION

This invention relates generally to a distributed bandwidth system and, more particularly, to trusted elements within a distributed bandwidth system.

BACKGROUND OF THE INVENTION

In communications systems, a subscriber unit is a "dumb element" and is not a trusted element. Typically, a subscriber unit requests a session connection and the session disconnection from a trusted element at a higher level in the communications system's architecture. For example, the trusted element can be a base station or a switch.

Usage is based on the connection time and the disconnection time of the subscriber unit's session as determined by the higher level trusted element. For example, a trusted network controller calculates the difference between a connect time and a disconnect time. The system uses this difference to generate billing data from which invoices are generated. The system does not depend on the subscriber unit for usage data. Therefore, there is little or no security at the subscriber unit level.

In a distributed bandwidth system, this type of system consumes more resources than is necessary. This type of system requires higher level devices to frequently monitor lower level devices that are not trusted elements. In this case, monitoring data is non-revenue-producing data and should be minimized.

What is needed is a method and apparatus for providing trusted elements within a distributed bandwidth system. What is also needed is a method and apparatus for providing more accurate usage data for the trusted elements. Further needed are a method and apparatus for providing a distributed metering capability that supports usage based and time based billing.

BRIEF DESCRIPTION OF THE DRAWINGS

FIG. 1 shows a simplified block diagram of a prior art system;

FIG. 2 illustrates a simplified block diagram of a distributed bandwidth metering system that uses trusted network elements in accordance with a preferred embodiment of the invention;

FIG. 3 shows a simplified message formatting structure for a programming message in accordance with a preferred embodiment of the invention;

FIG. 4 shows a simplified message formatting structure for a usage report message in accordance with a preferred embodiment of the invention;

FIG. 5 shows a simplified message formatting structure for a consolidated usage message in accordance with a preferred embodiment of the invention;

FIG. 6 shows a simplified message formatting structure for a matched usage message in accordance with a preferred embodiment of the invention;

FIG. 8 illustrates a flow diagram of a method of operating a network controller in accordance with a preferred embodiment of the invention; and FIG. 9 illustrates a flow diagram of a method of operating a billing center in accordance with a preferred embodiment of the invention.

DETAILED DESCRIPTION OF A PREFERRED EMBODIMENT

Figure 7:
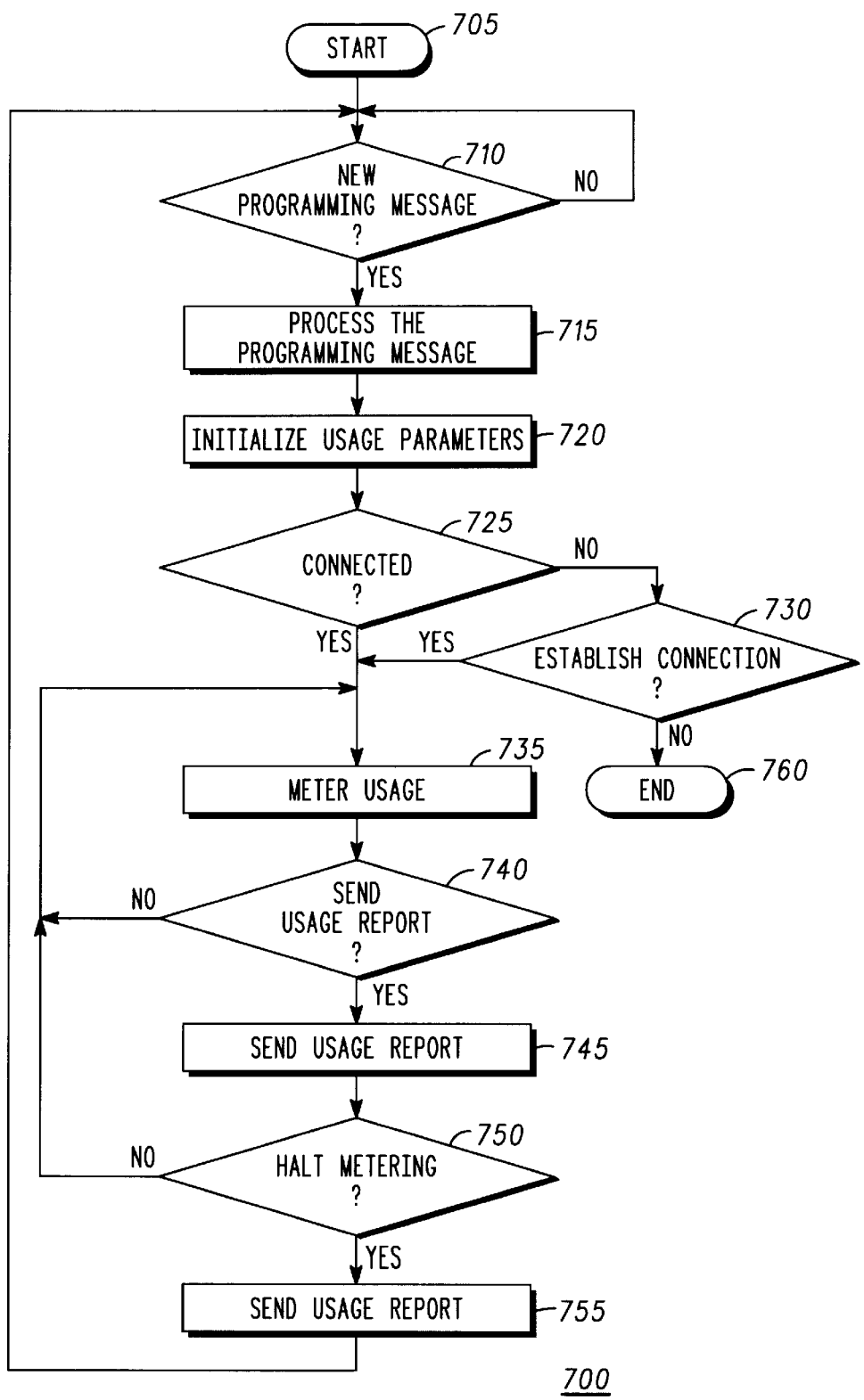
FIG. 7 illustrates a flow diagram of a method of operating a subscriber unit in accordance with a preferred embodiment of the invention.

The method and apparatus of the invention provide trusted elements within a distributed bandwidth system. The method and apparatus of the invention provide more accurate usage data for the trusted elements. The invention provides a distributed metering capability and supports usage based and time based billing.

In a preferred embodiment, the subscriber units operate as trusted elements, when metering and reporting usage data to the system.

FIG. 1 shows a simplified block diagram of a prior art system. In the prior art system, connect requests 130 and disconnect requests 140 were sent between subscriber units 110 and one or more network controllers 120. Network controller 120 uses connect request data and disconnect request data to calculate the usage for a particular subscriber unit and calculate the bill.

FIG. 2 illustrates a simplified block diagram of a distributed bandwidth metering system that uses trusted network elements in accordance with a preferred embodiment of the invention. Distributed bandwidth metering system 200 comprises at least one subscriber unit 210, at least one network controller 230, and at least one billing center 250.

Subscriber unit 210 comprises security means 220 and report usage means 225. Security means 220 comprises hardware means (not shown) and software means (not shown). In a preferred embodiment, security means 220 and report usage means 225 allow subscriber unit 210 to operate as a trusted network element. For example, security means 220 ensures that the usage data is tamper-proof. In alternate embodiments, subscriber unit 210 can comprise one or more trusted elements that can operate simultaneously.

Subscriber unit 210 is coupled via link 215 to at least one network controller 230. Subscriber unit 210 monitors its own usage and passes that information to network controller 230. Subscriber unit 210 sends usage report messages to network controller 230 and receives programming messages from network controller 230.

Report usage means 225 meters and report usage using procedures described herein. Report usage means 225 comprises a controller (not shown), receiving means (not shown), sending means (not shown), and software (not shown).

Network controller 230 comprises security means 240 and usage management means 245. In a preferred embodiment, network controller 230 is a trusted network element and is coupled to a plurality of subscriber units 210. Security means 240 comprises hardware means (not shown) and software means (not shown). In a preferred embodiment, security means 240 and usage management means 245 allow network controller 230 to operate as a trusted network element.

Network controller 230 is coupled via link 235 to billing center 250. Network controller 230 collects and consolidates usage information and passes that information to billing center 250. Network controller 230 sends consolidated usage report messages to billing center 250 and receives matched usage messages from billing center 250.

Usage management means 245 receives and processes usage information from a plurality of subscriber units 210 using procedures described herein. In addition, usage management means 245 sends programming and billing information to the plurality of subscriber units 210 using procedures describe herein. Usage management means 245 comprises a controller (not shown), receiving means (not shown), sending means (not shown), and software (not shown).

Billing center 250 comprises security means 260 and billing management means 255. Billing management means 255 comprises a controller (not shown), receiving means (not shown), sending means (not shown), and software. In a preferred embodiment, billing center 250 is a trusted network element and is coupled to at least one network controller 230 via link 235. Security means 260 comprises hardware means (not shown) and software means (not shown). In a preferred embodiment, security means 260 and billing management means 255 allow billing center 250 to operate as a trusted network element.

Billing center 250 receives consolidated usage information from at least one network controller 230 and sends billing information to at least one network controller 230.

In addition, billing center 250 is coupled by secondary link 265 to at least one subscriber unit 210. Secondary link 265 is used when network controller 230 experiences a problem. Also, secondary link 265 is used when link 215 or link 235 experiences a problem. In a preferred embodiment, header information is changed to cause a consolidated usage message to be sent to the billing center instead of the network controller.

Billing center 250 periodically sends a message to a subscriber unit. The message requests that the subscriber unit send usage information to the billing center. In this manner, billing center can confirm usage information for a particular subscriber unit. For example, billing center 250 can request that the subscriber unit send one or more usage report messages to the billing center. The subscriber unit can send the usage report message to a billing center and a network controller 230. In alternate embodiments, a subscriber unit can also send usage report messages to one or more network controllers. For example, a second network controller could be assigned as a backup instead of a billing center, when a problem occurs.

FIG. 3 shows a simplified message formatting structure for a programming message in accordance with a preferred embodiment of the invention. In a preferred embodiment, the network controller uses programming messages 300 to send information to one or more subscriber units.

Programming message 300 comprises header 305, length field 310, opcode field 315, user ID field 320, measurement unit field 325, reporting frequency field 330, and price per unit field 335.

Header 305 comprises at least two bytes. Header 305 is used for routing a programming message and for establishing the start of a programming message.

Length field 310 comprises at least one byte. Length field 310 is used for determining the length of the programming message. Desirably, the length is measured in bytes, although this is not required for the invention. Programming messages can vary is length, and the variable length provides a means of providing security to the programming messages.

Opcode field 315 comprises at least one byte. Opcode field 315 is used for determining the message type and the order used for some of the fields within the programming message. In a preferred embodiment, opcode field 315 is used to determine the order for user ID field 320, measurement unit field 325, reporting frequency field 330, and price per unit field 335. In alternate embodiments, opcode field 315 can be used to interpret some of the fields differently.

User ID field 320 comprises at least two bytes. User ID field 320 is used for identifying an originating node and at least one terminating node. For example, the nodes can be subscriber units and/or service providers.

Measurement unit field 325 comprises at least one byte. Measurement unit field 325 is used for establishing the measurement unit that is to be used to a metering process. For example, measurement units can be bits, bytes, and/or time units.

Reporting frequency field 330 comprises at least one byte. Reporting frequency field 330 is used for establishing a reporting interval. For example, a subscriber unit can be programmed to report its usage in X second intervals, or in Y byte intervals, where X, and Y are or are not integers.

Price per unit field 335 comprises at least one byte. Price per unit field 335 is used for establishing a cost structure for a session. For example, cents per second can be used, or cents per byte can be used. Those skilled in the art will recognize that different cost structures and currencies can be used.

Programming message can be used to change the operating format for a subscriber unit. For example, the subscriber unit can be programmed to use a different reporting frequency when the system is experiencing problems with routing and/or loading.

FIG. 4 shows a simplified message formatting structure for a usage report message in accordance with a preferred embodiment of the invention. In a preferred embodiment, the subscriber units use usage report messages 400 to send information, including metered usage, to one or more network controllers.

Usage report message 400 comprises header 405, length field 410, opcode field 415, user ID field 420, start time field 425, end time field 430, raw usage field 435, and measurement unit field 440.

Header 405 comprises at least two bytes. Header 405 is used for routing a usage report message and for establishing the start of a usage report message.

Length field 410 comprises at least one byte. Length field 410 is used for determining the length of the usage report message. Desirably, the length is measured in bytes, although this is not required for the invention. Usage report messages can vary is length, and the variable length provides a means of providing security to the usage report messages.

Opcode field 415 comprises at least one byte. Opcode field 415 is used for determining the message type and the order used for some of the fields within the usage report message. In a preferred embodiment, opcode field 415 is used to determine the order for user ID field 420, start time field 425, end time field 430, raw usage field 435, and measurement unit field 440. In alternate embodiments, opcode field 415 can be used to interpret some of the fields differently.

User ID field 420 comprises at least two bytes. User ID field 420 is used for identifying an originating node and at least one terminating node. For example, the nodes can be subscriber units and/or service providers.

Start time field 425 comprises at least one byte. Start time field 425 is used for establishing when the metered session being reported began. For example, the start time can be based on time or on a specific number of bytes.

End time field 430 comprises at least one byte. End time field 430 is used for establishing when the metered session being reported ended. For example, the end time can be based on time or on a specific number of bytes.

Raw usage field 435 comprises at least one byte. Raw usage field 435 is used for reporting metered usage. Desirably, the raw usage is report as a number.

Measurement unit field 440 comprises at least one byte. Measurement unit field 440 is used for establishing a unit of measure that the subscriber unit has used during this metered session. For example, measurement units can be bits, bytes, and/or time units.

In a preferred embodiment, a subscriber unit stores at least one programming message and at least one usage report message. The subscriber unit expects to receive an acknowledgement message after it sends a usage report message. If the subscriber unit does not receive an acknowledgement within a specified amount of time, the subscriber unit resends the last usage report message. If an acknowledgement message has not been received after N attempts, the subscriber unit sends the last usage message either to another network controller or to a billing center. In this manner, the usage data from one trusted element is received by at least one other trusted element.

FIG. 5 shows a simplified message formatting structure for a consolidated usage message in accordance with a preferred embodiment of the invention. In a preferred embodiment, a network controller uses consolidated usage messages 500 to send information to one or more billing centers.

Consolidated usage message 500 comprises header 505, length field 510, opcode field 515, controller ID field 520, originator ID field 525, terminator ID field 530, measurement unit field 535, session start time field 540, session end time field 545, and total usage field 550.

Header 505 comprises at least two bytes. Header 505 is used for routing consolidated usage message 500 and for establishing the start of consolidated usage message 500.

Length field 510 comprises at least one byte. Length field 510 is used for determining the length of consolidated usage message 500. Desirably, the length is measured in bytes, although this is not required for the invention. Consolidated usage messages can vary is length, and the variable length provides a means of providing security to the consolidated usage messages.

Opcode field 515 comprises at least one byte. Opcode field 515 is used for determining the message type and the order used for some of the fields within consolidated usage message 500. In a preferred embodiment, opcode field 515 is used to determine the order for controller ID field 520, originator ID field 525, terminator ID field 530, measurement unit field 535, session start time field 540, session end time field 545, and total usage field 550. In alternate embodiments, opcode field 515 can be used to interpret some of the fields differently.

Controller ID field 520 comprises at least one byte. Controller ID field 520 is used for identifying the network controller that sent the consolidated usage message to the billing center.

Originator ID field 525 comprises at least one byte. Originator ID field 525 is used for identifying at least one originating node.

Terminator ID field 530 comprises at least one byte. Terminator ID field 530 is used for identifying at least one terminating node. For example, the nodes can be subscriber units and/or service providers.

Measurement unit field 535 comprises at least one byte. Measurement unit field 535 is used for establishing a unit of measure that has been used during this metered session. For example, measurement units can be bits, bytes, and/or time units.

Session start time field 540 comprises at least one byte. Session start time field 540 is used for establishing when the metered session being reported began. For example, the start time can be based on time or on a specific number of bytes.

Session end time field 545 comprises at least one byte. Session end time field 545 is used for establishing when the metered session being reported ended. For example, the end time can be based on time or on a specific number of bytes.

Total usage field 550 comprises at least one byte. Total usage field 550 is used for reporting metered usage. Desirably, the total usage is report as at least one number. Usage numbers for at least one originator and at least one terminator can also be sent by adjusting the value of the opcode field.

FIG. 6 shows a simplified message formatting structure for a matched usage message in accordance with a preferred embodiment of the invention. In a preferred embodiment, a billing center uses matched usage messages 600 to send information to one or more network controllers.

Matched usage message 600 comprises header 605, length field 610, opcode field 615, controller ID field 620, originator ID field 625, terminator ID field 630, originator measurement unit field 635, terminator measurement unit field 640, originator total usage field 645, terminator total usage field 650, and total billed amount field 655.

Header 605 comprises at least two bytes. Header 605 is used for routing matched usage message 600 and for establishing the start of matched usage message 600.

Length field 610 comprises at least one byte. Length field 610 is used for determining the length of matched usage message 600. Desirably, the length is measured in bytes, although this is not required for the invention. Matched usage messages can vary is length, and the variable length provides a means of providing security to the matched usage messages.

Opcode field 615 comprises at least one byte. Opcode field 615 is used for determining the message type and the order used for some of the fields within matched usage message 600. In a preferred embodiment, opcode field 615 is used to determine the order for controller ID field 620, originator ID field 625, terminator ID field 630, originator measurement unit field 635, terminator measurement unit field 640, originator total usage field 645, terminator total usage field 650, and total billed amount field 655. In addition, opcode field 615 can be used to interpret some of the fields differently.

Controller ID field 620 comprises at least one byte. Controller ID field 620 is used for identifying a network controller. For example, the network controller can be the network controller that sent the last programming message to the subscriber unit.

Originator ID field 625 comprises at least one byte. Originator ID field 625 is used for identifying an originating node.

Terminator ID field 630 comprises at least one byte. Terminator ID field 630 is used for identifying a terminating node. For example, the nodes can be subscriber units and/or service providers.

Originator measurement unit field 635 comprises at least one byte. Originator measurement unit field 635 is used for establishing a unit of measure that was used by the originator during this metered session. For example, measurement units can be bits, bytes, and/or time units.

Terminator measurement unit field 640 comprises at least one byte. Terminator measurement unit field 640 is used for establishing a unit of measure that was used by the terminator during this metered session. For example, measurement units can be bits, bytes, and/or time units.

Originator total usage field 645 comprises at least one byte. Originator total usage field 645 is used for reporting metered usage by an originating node. Desirably, the total usage is reported for at least one originator. Usage numbers for more than one originator can also be sent by adjusting the value of the opcode field.

Terminator total usage field 650 comprises at least one byte. Terminator total usage field 650 is used for reporting metered usage by a terminating node. Desirably, the total usage is reported for at least one terminator. Usage numbers for more than one terminator can also be sent by adjusting the value of the opcode field.

Total billed amount field 655 comprises at least one byte. Total billed amount field 655 is used for reporting the total billed amount. Desirably, the total billed amount is reported as at least one number. Billed amount numbers for at least one originator and at least one terminator can also be sent by adjusting the value of the opcode field.

FIG. 7 illustrates a flow diagram of a method of operating a subscriber unit in accordance with a preferred embodiment of the invention. Procedure 700 starts in step 705.

In step 710, a query is performed to determine if a new programming message has been received. Programming messages can be generated either externally or internally. For example, a user could initiate a session, and in this case, the controller within the subscriber unit generates a programming message in response to a user's input. In addition, the subscriber unit can receive a programming message from an external source such as a network controller or a billing center. In alternate embodiments, a subscriber unit could send and/or receive programming messages.

When a new programming message is received, then procedure 700 branches to step 715. When a new programming message has not been received, then procedure 700 branches back to step 710.

In step 715, the programming message is processed. From the programming message, the subscriber unit processes a header field, a length field, an opcode field, a measurement unit field, a reporting frequency field, and a price per unit field. The length field is used to establish a length in bytes for the programming message. Programming messages are variable in length, and this variable length provides an additional security measure for the subscriber unit.

In step 720, the usage parameters are initialized. After processing the programming message, the subscriber unit knows what measurement unit to use, how often to report its usage, and the price per unit the subscriber unit's account will be billed. In addition, the user will be prompted with a visual display for confirmation.

In step 725, a query is performed to determine if the subscriber unit has a communications path established within the system. A subscriber unit can be connected to at least one other subscriber unit in a primary system, to a network controller in a primary system, to a system controller in a primary system, or to a secondary system. For example, a subscriber unit could use a satellite communication system as a primary system and a terrestrial communication system as a secondary system.

In alternate embodiments, the subscriber unit could send a message to a system to allow the system to meter its usage. For example, a government-controlled system could require all subscriber units to operate using its rules. However, the subscriber unit continues to meter usage and can provide usage data to a user to ensure that the user has a record of the session.

When the subscriber unit does not have a communications path established within the system, then procedure 700 branches to step 730. When the subscriber unit does have a communications path established within the system, then procedure 700 branches to step 735.

In step 730, a query is performed to determine if a communications path can be established. A subscriber unit can make multiple attempts to establish a communications path within the system. Wait periods are established between attempts. In a preferred embodiment, the time to make a communications path is metered and reported to the network controller. For example, this usage data can be used to identify malfunctioning subscriber units (i.e., subscriber units that consistently required multiple attempts to access the system). In addition, this time can also be used to monitor wasted time for such things as user input errors.

When the subscriber unit cannot establish a communications path within the system, then procedure 700 branches to step 760 and ends. In a preferred embodiment, the subscriber unit sends a usage report message to the network controller. In alternate embodiments, a usage report message is not sent. When the subscriber unit can establish a communications path to a system, then procedure 700 branches to step 735.

In step 735, the usage is metered. This usage represents connect time and can include both busy and idle time. For example, a subscriber unit can send a request for data and then wait for the data to arrive.

The subscriber unit determines a reporting frequency from the reporting frequency field in the programming message. The reporting frequency is changed by the network controller. The network controller can change to reporting frequency, when the system is experiencing heavy loading. The network controller also changes the reporting frequency to prevent fraudulent users from altering their subscriber units. In addition, the metering function is performed within a tamper-proof portion of the subscriber unit.

In step 740, a query is performed to determine if usage report is to be sent. When the interval, determined from the reporting frequency field, has been reached, then a usage report message should be sent, and procedure 700 branches to step 745. When the interval, determined from the reporting frequency field, has not been reached, then procedure 700 branches back to step 735.

In step 745, the subscriber unit formats and sends a usage report message. Within the usage report message, the subscriber unit sends a header field, a length field, an opcode field, a user ID field, a start time field, an end time field, a raw usage field, and measurement unit field. The length field is used to establish a length in bytes for the usage report message. Usage report messages are variable in length, and this variable length provides an additional security measure for the subscriber unit.

In step 750, a query is performed to determine if the metering function should be halted. For example, when a subscriber unit lose its communications path to a system, the metering function is halted. In addition, when a session has ended, the metering function for this session is halted.

When the metering function is required, then procedure 700 branches back to step 735. When the metering function is not required, then procedure 700 branches to step 755.

In step 755, the subscriber unit formats and sends a usage report message. Within the usage report message, the subscriber unit sends a header field, a length field, an opcode field, a user ID field, a start time field, an end time field, a raw usage field, and measurement unit field. The length field is used to establish a length in bytes for the usage report message. Usage report messages are variable in length, and this variable length provides an additional security measure for the subscriber unit.

The opcode field identifies this usage report message as a session end message. In a preferred embodiment, the subscriber unit receives an acknowledgement message after sending a session end message. In an alternate embodiment, the subscriber unit does not receive an acknowledgement message after sending a session end message.

After step 755, procedure 700 branches back to step 710 and iterates as shown in FIG. 7.

FIG. 8 illustrates a flow diagram of a method of operating a network controller in accordance with a preferred embodiment of the invention. Procedure 800 starts in step 805. For example, procedure 800 can start when a usage report message is received from one of the trusted elements for which this network controller is responsible.

In step 810, the network controller processes the usage report message. Usage data is gathered for all subscriber units associated with a particular session. The network controller compares the data received from all of the subscriber units associated with a session to ensure that all of the subscriber units are billed properly. In this manner, fraudulent usage is minimized. The network controller validates the data from the subscriber units and records the data.

In step 815, a query is performed to determine if a new session is being opened. For example, one or more usage report messages can be received during a session.

When a new session is required, then procedure 800 branches to step 820. When a new session is not required, then procedure 800 branches to step 830.

In step 820, the network controller validates that the user has credit. Credit can represent pre-paid or post-paid usage.

In step 825, the network controller opens a user session. The network controller uses the user ID field to determine the identity of the subscribers units involved in a particular session. A session can involve one, two, or more subscriber units.

In step 830, the usage information from the usage report message is validated and added to the record for this particular session. Desirably, one or more usage report messages are received during a session.

In step 835, a query is performed to determine if a disconnect message has been processed. For example, a subscriber unit sends a disconnect message indicating that it has terminated its communications path.

When a disconnect message has not been processed, then procedure 800 branches back to step 810, and procedure 800 iterates as shown in FIG. 8. When a disconnect message has been processed, then procedure 800 branches to step 840.

In addition, the network controller comprises a time-out function. If the network controller does not receive a usage report message within a preset amount of time, then procedure 800 branches to step 840.

In step 840, the network controller closes the user session, formats a session record, and stores the session record.

In step 845, the network controller sends a copy of the session record to a billing center. A session record is sent using one or more consolidated usage messages.

In step 850, procedure 800 ends.

FIG. 9 illustrates a flow diagram of a method of operating a billing center in accordance with a preferred embodiment of the invention. Procedure 900 starts in step 905.

In step 910, a query is performed to determine if a new usage message has been received. Usage messages can be received from network controllers or subscriber units. In a preferred embodiment, a network controller sends a consolidated usage message, and a subscriber unit sends a usage report message. In addition, a billing center can receive a message from another billing center or a system controller. Desirably, a billing center sends and/or receives a number of different types of messages.

In step 915, the billing center processes a new usage message. Usage data is gathered for all subscriber units during each billing cycle. The billing center matches the consolidated usage from the network controllers. The billing center compares the data received from all of the network controllers associated with a session to ensure that all of the subscriber units are billed properly. In addition, the billing center can receive usage data from individual subscriber units to overcome problems and/or validate usage. In this manner, fraudulent usage is minimized. The billing center consolidates the data from the network controllers and the subscriber units, processes the data, and records the data.

In step 920, the billing center sends billing information to the network controllers using one or more matched usage messages. A network controller can forward individual billing information to each of the subscriber units. In addition, a billing center can send billing information directly to a subscriber unit. For example, a subscriber unit can request a billing confirmation from a network controller or a billing center.

When an external user and/or network controller was also involved during the session being examined, the billing center can provide billing information to the external network controller. For example, one or more external controllers could have cross-usage agreements in place.

Procedure 900 ends with step 925.

In summary, a distributed bandwidth metering system with trusted elements has been described. The invention has been described above with reference to a preferred embodiment. However, those skilled in the art will recognize that changes and modifications can be made in this preferred embodiment without departing from the scope of the invention. For example, the block diagram identified herein can be organized differently than described herein while achieving equivalent results. In addition, the number of functional blocks could be different from that described in the preferred embodiment. These and other changes and modifications, which are obvious to those skilled in the art, are intended to be included within the scope of the invention.

What is claimed is:

1. A distributed bandwidth metering system comprising:
   a plurality of subscriber units, wherein a subscriber unit comprises a first means for operating as a trusted element;
   a billing center comprising a second means for operating as a trusted element;
   a network controller coupled to said plurality of subscriber units and to said billing center, said network controller comprising a third means for operating as a trusted element;
   wherein said first means comprises
      a first security means;

a report usage means coupled to said first security means; and wherein each of said subscriber units comprises:
  a first receiving means coupled to said first security means and to said report usage means, said first receiving means for receiving a programming message; and
  a first sending means coupled to said first security means and to said report usage means, said first sending means for sending a usage report message.

2. The distributed bandwidth metering system as claimed in claim 1, wherein said programming message comprises:
  a header for routing said programming message and for establishing a start of said programming message;
  a length field for determining a length of said programming message;
  an opcode field for determining message type and an order for fields within said programming message;
  a user ID field for identifying an originating node and at least one terminating node in a metered session;
  a measurement unit field for establishing a measurement unit for said metered session;
  a reporting frequency field for establishing a reporting interval; and
  a price per unit field for establishing a cost structure for said metered session.

3. The distributed bandwidth metering system as claimed in claim 1, wherein said usage report message comprises:
  a header for routing said usage report message and for establishing a start of said usage report message;
  a length field for determining a length of said usage report message;
  an opcode field for determining message type and an order for fields within said usage report message;
  a user ID field for identifying an originating node and at least one terminating node in a metered session;
  a start time field for establishing when said metered session began;
  an end time field for establishing when said metered session ended;
  a raw usage field for reporting metered usage; and
  a measurement unit field for establishing a unit of measure for said metered session.

4. The distributed bandwidth metering system as claimed in claim 1, wherein said second means for operating as a trusted element in said distributed bandwidth metering system further comprises:
  a second security means; and
  a processing means coupled to said second security means.

5. The distributed bandwidth metering system as claimed in claim 4, wherein said billing center further comprises:
  a second receiving means coupled to said second security means and to said processing means, said second receiving means for receiving a consolidated usage message; and
  a second sending means coupled to said second security means and to said processing means, said second sending means for sending a matched usage message.

6. The distributed bandwidth metering system as claimed in claim 5, wherein said consolidated usage message comprises:
  a header for routing said consolidated usage message and for establishing a start of said consolidated usage message;
  a length field for determining a length of said consolidated usage message;
  an opcode field for determining message type and an order for fields within said consolidated usage message;
  a user ID field for identifying an originating node and at least one terminating node in a metered session;
  a controller ID field for identifying a network controller that sent said consolidated usage message to said billing center;
  an originator ID field for identifying an originating node;
  a terminator ID field for identifying at least one terminating node;
  a measurement unit field for establishing a measurement unit for said metered session;
  a session start time field for establishing when said metered session being reported began;
  a session end time field for establishing when said metered session being reported ended; and
  a total usage field for reporting metered usage.

7. The distributed bandwidth metering system as claimed in claim 5, wherein said matched usage message comprises:
  a header for routing said matched usage message and for establishing a start of said matched usage message;
  a length field for determining a length of said matched usage message;
  an opcode field for determining message type and an order for fields within said matched usage message;
  a controller ID field for identifying a network controller that sent a consolidated usage message to said billing center;
  an originator ID field for identifying an originating node for a metered session;
  a terminator ID field for identifying a terminating node;
  an originator measurement unit field for establishing a unit of measure that was used by said originating node during said metered session;
  a terminator measurement unit field for establishing a unit of measure that was used by said terminating node during said metered session; and
  a total billed amount field for reporting a total billed amount.

8. The distributed bandwidth metering system as claimed in claim 1, wherein said third means for operating as a trusted element in said distributed bandwidth metering system further comprises:
  a third security means; and
  a billing management means coupled to said third security means.

9. The distributed bandwidth metering system as claimed in claim 8, wherein said billing management means further comprises:
  a controller;
  a third receiving means coupled to said third security means and to said controller, said third receiving means for receiving a matched usage message and for receiving a usage report message; and
  a third sending means coupled to said third security means and to said controller, said third sending means for sending a consolidated usage message and for sending a programming message.

10. A subscriber unit adapted to operate as a trusted element in a distributed bandwidth metering system, said subscriber unit comprising:

a first security means;

a report usage means coupled to said first security means;

a first receiving means coupled to said first security means and to said report usage means, said first receiving means for receiving a programming message; and a first sending means coupled to said first security means and to said report usage means, said first sending means for sending a usage report message.

11. The subscriber unit as claimed in claim 10, wherein said programming message comprises:

a header for routing said programming message and for establishing a start of said programming message;

a length field for determining a length of said programming message;

an opcode field for determining message type and an order for fields within said programming message;

a user ID field for identifying an originating node and at least one terminating node in a metered session;

a measurement unit field for establishing a measurement unit for said metered session;

a reporting frequency field for establishing a reporting interval; and a price per unit field for establishing a cost structure for said metered session.

12. The subscriber unit as claimed in claim 10, wherein said usage report message comprises:

a header for routing said usage report message and for establishing a start of said usage report message;

a length field for determining a length of said usage report message;

an opcode field for determining message type and an order for fields within said usage report message;

a user ID field for identifying an originating node and at least one terminating node in a metered session;

a start time field for establishing when said metered session began;

an end time field for establishing when said metered session ended;

a raw usage field for reporting metered usage; and a measurement unit field for establishing a unit of measure for said metered session.

13. A network controller adapted to operate as a trusted element in a distributed bandwidth metering system, said network controller comprising:

a security means;

a controller coupled to said security means;

a receiving means coupled to said security means and to said controller, said receiving means for receiving a matched usage message and for receiving a usage report message; and a sending means coupled to said security means and to said controller, said sending means for sending a consolidated usage message and for sending a programming message.

14. The network controller as claimed in claim 13, wherein said consolidated usage message comprises:

a header for routing said consolidated usage message and for establishing a start of said consolidated usage message;

a length field for determining a length of said consolidated usage message;

an opcode field for determining message type and an order for fields within said consolidated usage message;

a user ID field for identifying an originating node and at least one terminating node in a metered session;

a controller ID field for identifying a network controller that sent said consolidated usage message;

an originator ID field for identifying an originating node;

a terminator ID field for identifying at least one terminating node;

a measurement unit field for establishing a measurement unit for said metered session;

a session start time field for establishing when said metered session being reported began;

a session end time field for establishing when said metered session being reported ended; and a total usage field for reporting metered usage.

15. The network controller as claimed in claim 13, wherein said matched usage message comprises:

a header for routing said matched usage message and for establishing a start of said matched usage message;

a length field for determining a length of said matched usage message;

an opcode field for determining message type and an order for fields within said matched usage message;

a controller ID field for identifying a network controller that sent a consolidated usage message;

an originator ID field for identifying an originating node in a metered session;

a terminator ID field for identifying a terminating node;

an originator measurement unit field for establishing a unit of measure that was used by said originating node during said metered session;

a terminator measurement unit field for establishing a unit of measure that was used by said terminating node during said metered session; and a total billed amount field for reporting a total billed amount.

16. A billing center adapted to operate as a trusted element in a distributed bandwidth metering system, said billing center comprising:

a security means;

a controller coupled to said security means;

a receiving means coupled to said security means and to said controller, said receiving means for receiving a consolidated usage message; and a sending means coupled to said security means and to said controller, said sending means for sending a matched usage message.

* * * * *